(12) United States Patent
Tomiyasu et al.

(10) Patent No.: US 7,135,655 B2
(45) Date of Patent: Nov. 14, 2006

(54) ARC WELDING CABLE

(75) Inventors: Kazuhiro Tomiyasu, Fukuoka (JP);
Koji Muragaki, Fukuoka (JP); Seigo Nishikawa, Fukuoka (JP); Kazuhiro Haniya, Fukuoka (JP); Atsushi Ichibangase, Fukuoka (JP); Shunsuke Maeda, Fukuoka (JP); Kazuhiko Nishimura, Fukuoka (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 48 days.

(21) Appl. No.: 10/502,540

(22) PCT Filed: Feb. 3, 2003

(86) PCT No.: PCT/JP03/01087

§ 371 (c)(1),
(2), (4) Date: Jul. 27, 2004

(87) PCT Pub. No.: WO03/066267

PCT Pub. Date: Aug. 14, 2003

(65) Prior Publication Data

US 2005/0150883 A1    Jul. 14, 2005

(30) Foreign Application Priority Data

Feb. 8, 2002    (JP)    ............................. 2002-032184

(51) Int. Cl.
*B23K 9/32* (2006.01)
*H01B 5/00* (2006.01)

(52) U.S. Cl. ................. 219/137.9; 174/126.1

(58) Field of Classification Search ............ 219/137.9, 219/137.51, 137.52; 29/517, 825; 174/126.1, 174/68, 68.1, 251, 252, 258, 121 R
See application file for complete search history.

(56) References Cited

U.S. PATENT DOCUMENTS

| | | | | |
|---|---|---|---|---|
| 2,535,187 A | * | 12/1950 | Anderson et al. | .......... 174/15.7 |
| 2,835,721 A | * | 5/1958 | Leathers | ................... 174/15.7 |
| 3,281,571 A | * | 10/1966 | Gilmore | .................. 219/137.9 |
| 3,755,648 A | * | 8/1973 | Rothman et al. | ...... 219/137.51 |
| 4,403,136 A | * | 9/1983 | Colman | ................. 219/137.31 |
| 4,432,605 A | * | 2/1984 | Niiro et al. | ................. 385/111 |
| 4,538,350 A | * | 9/1985 | Nosal et al. | ................... 29/825 |
| 4,783,138 A | * | 11/1988 | Oestreich | ..................... 385/108 |
| 4,853,516 A | * | 8/1989 | Julien et al. | ................ 174/15.7 |
| 4,855,532 A | * | 8/1989 | Tanabe | ........................ 174/15.7 |
| 5,256,844 A | * | 10/1993 | Grosvik et al. | ............. 219/629 |
| 5,595,671 A | * | 1/1997 | David | .................... 219/137.62 |
| 6,566,604 B1 | * | 5/2003 | Booth et al. | ............ 174/110 R |

(Continued)

FOREIGN PATENT DOCUMENTS

JP    55-154685 U    11/1980

(Continued)

*Primary Examiner*—Kevin Kerns
*Assistant Examiner*—Michael Aboagye
(74) *Attorney, Agent, or Firm*—Sughrue Mion, PLLC

(57) ABSTRACT

An arc welding cable that is resistant to bending and twisting and can give a long life is provided. For this purpose, an arc welding cable (65) for supplying a welding current, a welding wire and a sealed gas from a wire feeding device (61) to a welding torch (64), has a passage (4) for the welding wire (2) and sealed gas is located at a center of the arc welding cable and a plurality of conductors (5) are arranged apart from one another on a circumference around the passage (4). The space between the plurality of conductor (5) may be filled with a cushion material such as cotton or elastic synthetic resin.

8 Claims, 3 Drawing Sheets

U.S. PATENT DOCUMENTS

2003/0056969 A1\* 3/2003 Eves et al. .................. 174/68.1

FOREIGN PATENT DOCUMENTS

| JP | 59-14217 A | 1/1984 |
|----|------------|--------|
| JP | 59-68674 U | 5/1984 |
| JP | 60-20368 U | 2/1985 |
| JP | 9-295153 | \* 11/1997 |
| JP | 9-295153 A | 11/1997 |
| JP | 09295153 | \* 11/1997 |

\* cited by examiner

ARC WELDING CABLE

TECHNICAL FIELD

This invention relates to an arc welding cable for supplying a welding current, a welding wire and a sealed gas from a wiring feeding device to a welding torch.

BACKGROUND ART

A welding robot is now being widely used for performing arc welding with a welding torch for arc welding that is attached to the tip of a vertical articulated robot.

FIG. 5 shows the outward appearance of this welding robot. In FIG. 5, reference numeral 51 denotes a vertical articulated robot; and reference numeral 52 denotes its upper arm. A wrist 53 which can perform the operation with three degrees of freedom (slewing, swing and rotation) is attached to the tip of the upper arm 52. Reference numeral 61 denotes a wire feeding device. The wire feeding device 61 is fixed to the upper arm 52 to extract a welding wire 63 from a wire reel 62 and extrude the welding wire 63 to a welding torch 64 attached to the wrist 53. Reference numeral 65 denotes a welding cable. The welding cable 65 connects the wire feeding device 61 and the welding torch 64. The welding cable 65 is provided with a tubular passage at the center through which a welding wire is passed. The welding cable 65 binds a hose for supplying a sealed gas, an electric wire for supplying a welding current and various kinds of signal lines, which are arranged around the tubular passage.

Meanwhile, in such a conventional welding robot, the wire feeding device 61 is fixed to the upper arm 52. The welding torch 64 attached to the wrist 53, which performs the operation with three degrees of freedom, moves freely. The welding cable 65, therefore, repeats bending or twisting. This presented a problem that the welding cable 65 might be broken owing to stress.

Particularly, if the welding cable 65 is located near the upper arm 52 and wrist 53 (as shown by dotted line in FIG. 5) in order that it does not interferes with objects in the vicinity of the robot 51 (e.g. a welding workpiece or jig), the bending radius is small and the length is also short. The bending stress and twisting stress, correspondingly, become large. This presented a problem of further shortening the life of the welding cable 65.

DISCLOSURE OF THE INVENTION

This invention intends to provide an arc welding cable that is resistant to bending and twisting and can give a long life.

In order to solve the above problem, according to one aspect of the present invention there is provided an arc welding cable for supplying a welding current, a welding wire and a sealed gas from a wire feeding device to a welding torch, having a passage for the welding wire and the sealed gas is located at a center of the arc welding cable, wherein a plurality of conductors are provided so as to be apart from one another on a circumference around the passage.

Further, according to a second aspect of the present invention spaces defined among the plurality of conductors are filled with a cushion material.

Furthermore, according to a third aspect of the present invention the cushion material is cotton.

Furthermore, according to a fourth aspect of the present invention the cushion material is an elastic synthetic resin.

Furthermore, according to a fifth aspect of the present invention the conductors are covered wires that are covered with an insulator.

Furthermore, according to a sixth aspect of the present invention core made of a fiber with a high tensile strength is located at a center of the conductor.

Furthermore, according to a seventh aspect of the present invention the arc welding cable further has a shaft that is provided on an end portion thereof and engages with a socket of the wire feeding device or the welding torch so as to pass the welding current and sealed gas, a first caulking portion that caulks with the conductors to electrically connect the shaft with the arc welding cable and a second caulking portion which collectively caulks a hose for the sealed gas, the conductors and a sheath of an outer layer of the arc welding cable onto the shaft to mechanically connect the shaft with the arc welding cable.

Furthermore, according to an eighth aspect of the present invention each conductor is a twisted pair wires having of a pair of a right-twisted strand of wires twisted clockwise and a left-twisted strand of wires twisted counterclockwise.

Further more, according to a ninth aspect of the present invention a part of the conductors is a signal line.

Further more, according to a tenth aspect of the present invention the arc welding cables further comprise a cooling water hose, wherein a part of the conductors is replaced with the cooling water hose.

BEST MODE FOR CARRYING OUT THE INVENTION

Figure 1:
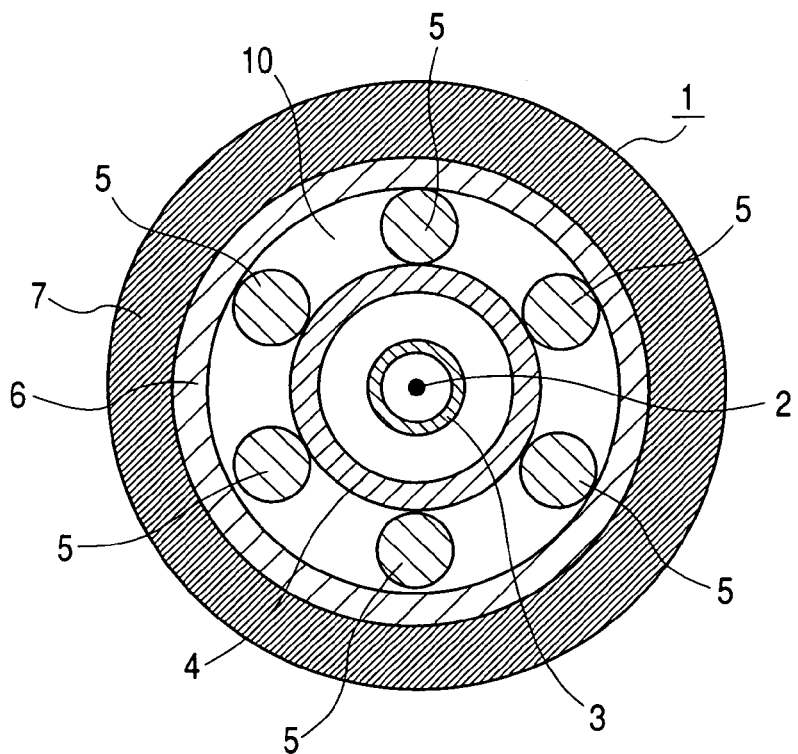
FIG. 1 is a cross sectional view of an arc welding cable showing a first embodiment of this invention.

Now referring to the drawings, an explanation will be given of embodiments of this invention.

FIG. 1 is a cross sectional view of an arc welding cable showing a first embodiment of this invention. In FIG. 1, reference numeral 1 denotes an arc welding cable; and reference 2 denotes a welding wire. The welding wire 2 is fed from a wire feeding device (not shown) toward a welding torch through a conduit liner 3 located at the center of the arc welding cable 1. Namely, the interior space of the conduit liner 3 constitutes a welding wire passage. Reference numeral 4 denotes a gas hose for supplying a sealed gas to the welding torch not shown. Reference numeral 5 denotes one of conductors arranged on the outer periphery of the gas hose 4. In this figure, six conductors are arranged. The conductor 5 is a wire for passing a welding current. Reference numeral 6 denotes a holding tape wound around the outer periphery of the conductors 5. Reference numeral 7 denotes a sheath located at the outermost side of the arc welding cable 1 for sheathing the conductors 5. The sheath 7 is made of PVC (polyvinyl chloride) with high heat-resistance, insulating property and elasticity.

Figure 2:
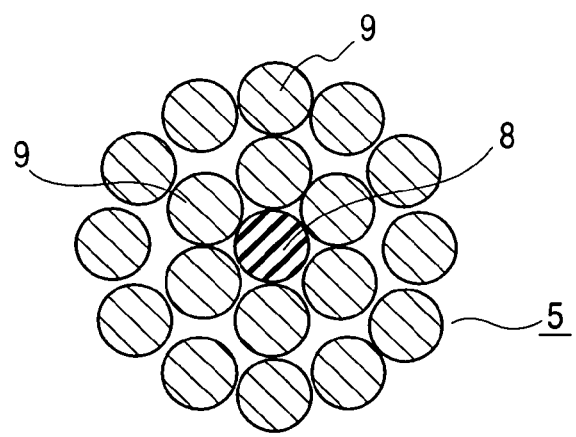
FIG. 2 is a detailed cross sectional view of a conductor showing the first embodiment of this invention.

FIG. 2 is a detailed cross sectional view of the conductor 5. The conductor 5 includes a core 8 of a fiber with a high tensile strength (e.g., poly-paraphenyline terephthalamide, such as KEVLAR of Du Pont (trade mark)) arranged at the center, 6 (six) sets of strands 9 arranged around the core 8 and 12 (twelve) sets of the same strands 9 arranged further around them. The strand 9 consists of 7 (seven) sets of twists each having 13 (thirteenth) tied soft iron wires each 0.08 mm in diameter. The conductor 5 has both softness and strength since the tensile strength is shared by the core 8.

Figure 3:
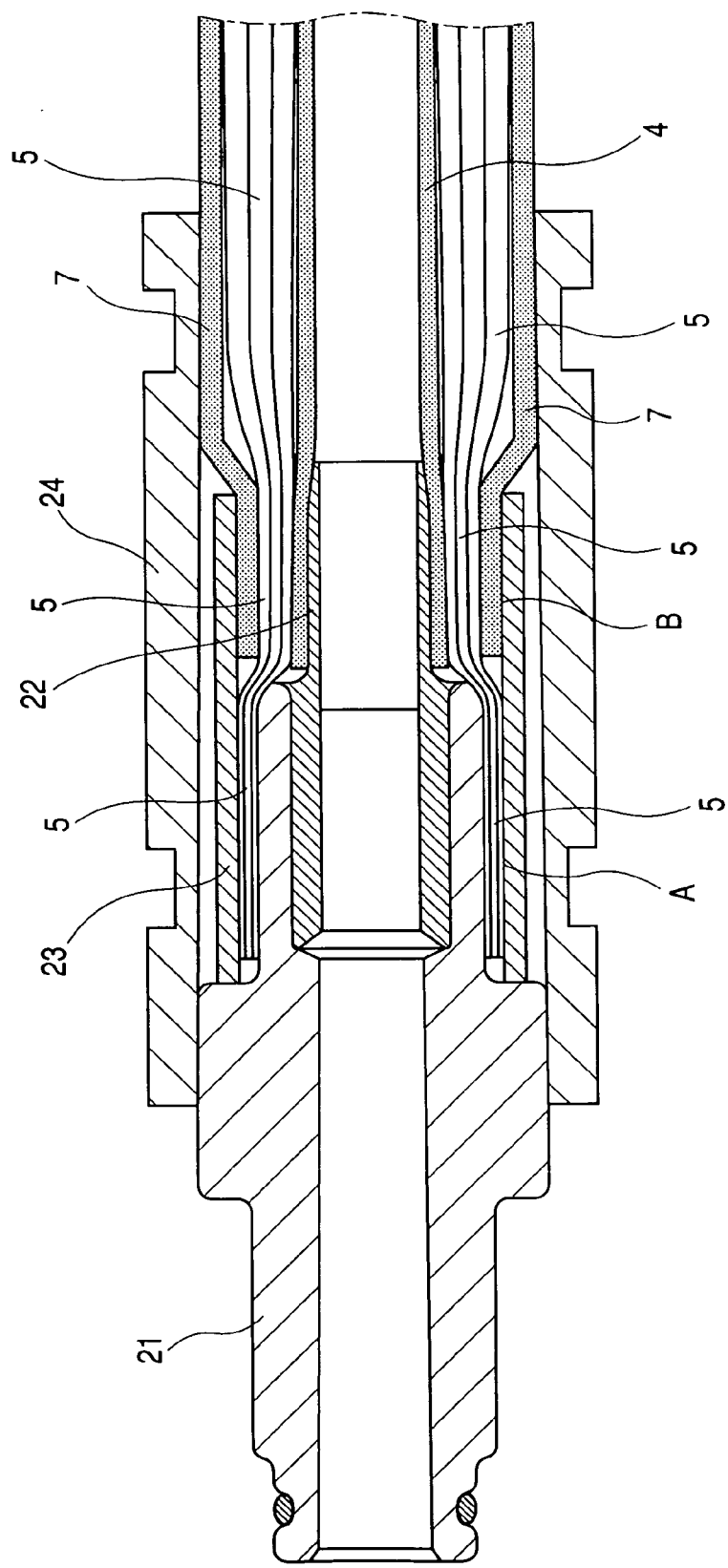
FIG. 3 is a longitudinal sectional view of the end of an arc welding cable showing the first embodiment of this invention.

FIG. 3 is a longitudinal sectional view of the end of an arc welding cable showing the first embodiment of this invention. In FIG. 3, reference numeral 21 denotes a shaft that is a hollow cylinder of bronze. The shaft 21 is fit in a socket of a welding torch not shown so that a welding current is passed through the welding torch. The shaft is connected to a gas hose 4 of the arc welding cable 1 through a cap 22 so that a sealed gas flows through the cylinder portion.

Reference numeral 23 denotes a caulking pipe that is formed of a copper cylinder. In FIG. 3, at a portion A, the conductors 5 are located outside the shaft 4, and a caulking pipe 23 is located outside the conductors 5. The conductors 5 are firmly crimped on the shaft 21 through "caulking" by the caulking pipe 23. In this way, at the portion A, an electric connection is made between the conductors 5 and the shaft 21. Incidentally, it is needless to say that at the portion A, the core 8 (not shown in FIG. 3) at the center of the conductor 5 is also simultaneously crimped.

At portion B in FIG. 3, the gas hose 4 is located outside the cap 22; the conductors 5 are located outside the gas hose 4; and a sheath 7 is located outside the conductors 5. The sheath 7, conductors 5 and gas hole 4 are fixed to the cap 22 through "caulking" by the caulking pipe 23. In this way, at the portion B, a mechanical connection is made between the arch welding cable 1 and the shaft 21. Namely, the force of bending or twisting applied by the arc welding cable 1 is shared by portion B so that it is transmitted to the shaft 21. In the portion on the right side of portion B, the conductors 5 are free from the gas hose 4 and sheath 7 so that they are freely movable in the gap between the gas hose 4 and the sheath 7.

Reference numeral 24 denotes an insulating cover. The insulating cover 24 is formed of a rubber cylinder, The insulating cover 24 covers the connecting portion between the arc welding cable 1 and the shaft 21 so that they are electrically insulated. Incidentally, the welding wire 2, conduit liner 3 and holding tape 6 are not shown in FIG. 3 in order to avoid complication.

As shown in FIG. 1, the conductors 5 are arranged in an annular space 10 between the gas hose 4 and the holding tape 6. The space 10 between the six conductors 5 is not filled with any material. The conductors 5, therefore, can be moved or deformed in the space 10. Thus, when the deformation of bending or twisting is occurred on the arc welding cable 1, the conductors 5 move in a direction of alleviating the bending or twisting within the space 10. Accordingly, even when a large bending or twisting is occurred on the arc welding cable 1, the conductors 5 suffer from only small stress.

Figure 4:
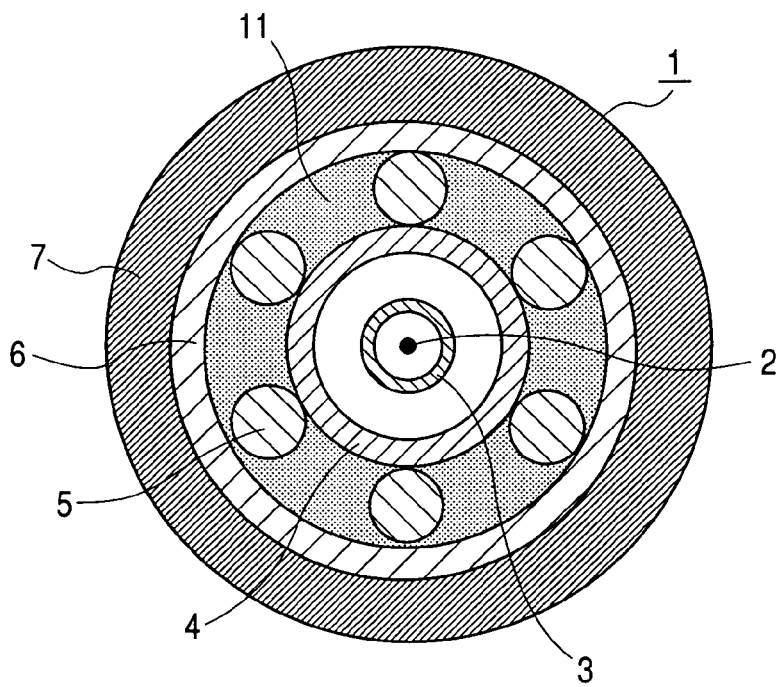
FIG. 4 is a cross sectional view of an arc welding cable showing a second embodiment of this invention.
Figure 5:
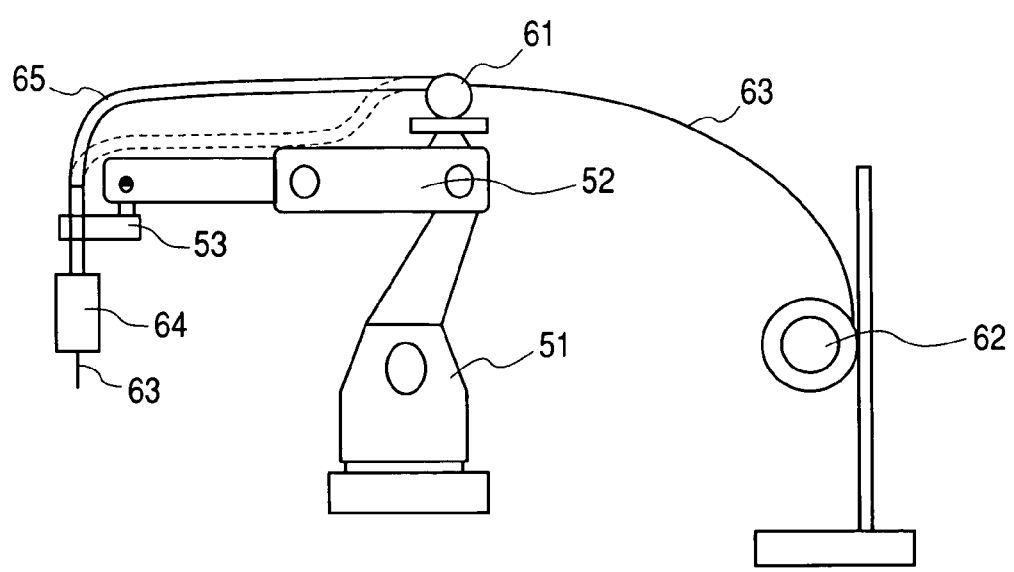
FIG. 5 is a view for explaining the configuration of a welding robot.

FIG. 4 is a cross sectional view of an arc welding cable showing a second embodiment of this invention. In FIG. 4, like reference numerals refer to like elements in the first embodiment. In FIG. 4, reference numeral 11 denotes cotton filling the space between the sixth conductors 5. The cotton 11 serves as a cushion material between the conductors 5. Namely, when the arc welding cable 1 suffers from bending or twisting, the cotton slowly deforms the conductors 5 and disperses the deformation of the conductors 5 so that it is not concentrated to a specific spot. When the bending or twisting has come loose, the deformation of the conductors slowly returns to the initial state by the action of the cotton 11.

The cotton 11 may be replaced by other material or substance as long as cushion that serves as a buffer. For example, various kinds of elastic synthetic resins may fill the space between the conductors 5.

In the embodiments described above, the conductor 5 does not have a cover, but it may be a covered wire. Further, the conductor 5 may be a twisted pair wire that is a set of two strands twisted in different directions (one twisted clockwise and the other twisted counterclockwise). In the case of the twisted pair wire, when the conductor 5 suffers from twisting, the one strand is tightened whereas the other strand is loosened. This increases the strength of the conductor against the twisting.

Further, a part of the six conductors 5 may be replaced by a signal wire, e.g. a signal wire for a shock sensor for detecting that the welding torch 64 has collided with a workpiece. In this way, since the signal wire that has been wired separately from the arc welding cable 1 is integrated to the arc welding cable 1, possibility of breaking the signal wire due to its snagging on the workpiece is reduced, and the appearance of the arc welding cable 1 is made neat.

Further, a part of the conductor 5 may be replaced by a hose for cooling water for cooling the welding torch 64. Integration of the cooling water hose to the arc welding cable 1 reduces the possibility of breaking the cooling water hose.

As understood from the description hitherto made, according to one aspect of the invention described herein, a plurality of conductors are arranged apart from one another on a circumference around the sealed gas passage. For this reason, when the arc welding cable suffers from bending or twisting, the conductors move in a direction of escaping from the deformation due to the bending or twisting, thereby reducing the stress due to the bending or twisting. This presents an effect of increasing the life of the welding cable.

In second to fourth aspects of the inventions described herein, the space between the respective conductors is filled with cotton or resin serving as a cushion material. This alleviates concentration of the deformation of the conductors to a specific point, thereby presenting an effect of further increasing the life of the welding cable.

In a fifth aspect of the invention described herein, the conductors are defined as covered wires. This presents an effect of preventing a danger of electrical leak even when the sheath is broken.

In a sixth aspect of the invention described herein, a core made of a fiber with a high tensile strength is located at the center of the conductor. This presents an effect of providing the arc welding cable having both mechanical strength and flexibility.

In a seventh aspect the invention described herein includes a first caulking portion which electrically connects the shaft to the arc welding cable and a second caulking portion which mechanically couples them so that external force is applied to the first caulking portion. This presents an effect of increasing the reliability of the electrical coupling portion.

In an eighth aspect of the invention described in herein, the conductor is defined as a twisted pair wire. This presents an effect of making the conductor more resistant to twisting, thereby lengthening the life of the welding cable.

In ninth and tenth aspects of the inventions described herein, the signal wire or cooling water hose is integrated to the welding cable. This presents an effect of reducing danger of breaking the signal wire or cooling water hose.

INDUSTRIAL APPLICABILITY

This invention is useful as an arc welding cable for supplying a welding current, a welding wire and a sealed gas from a wire feeding device to a welding torch.

The invention claimed is:

1. An arc welding cable for supplying a welding current, a welding wire and a sealed gas from a wire feeding device to a welding torch, comprising:
    a passage for the welding wire and the sealed gas, the passage being located at a center of the arc welding cable,
    wherein a plurality of conductors are provided so as to be apart from one another on a circumference around the passage,
    wherein spaces defined among the plurality of conductors are filled with cotton.

2. The arc welding cable as set forth in of claim 1, wherein the conductors are covered wires that are covered with an insulator.

3. The arc welding cable as set forth in claim 1, wherein a core made of a fiber with a high tensile strength is located at a center of the conductor.

4. The arc welding cable as set forth in claim 1, further comprising:
    a shaft that is provided on an end portion thereof and engages with a socket of the wire feeding device or the welding torch so as to pass the welding current and sealed gas;
    a first caulking portion that caulks with the conductors to electrically connect the shaft with the arc welding cable; and
    a second caulking portion which collectively caulks a hose for the sealed gas, the conductors and a sheath of an outer layer of the arc welding cable onto the shaft to mechanically connect the shaft with the arc welding cable.

5. The arc welding cable as set forth in claim 1, wherein the each conductors is a twisted pair wire comprising of a pair of a right-twisted strand of wires twisted clockwise and a left-twisted strand of wires twisted counterclockwise.

6. The arc welding cables as set forth in claim 1, wherein a part of the conductors is a signal line.

7. The arc welding cables as set forth in claim 1, further comprising a cooling water hose, wherein a part of the conductors is replaced with the cooling water hose.

8. An arc welding cable for supplying a welding current, a welding wire and a sealed gas from a wire feeding device to a welding torch, comprising:
    a passage for the welding wire and the sealed gas, the passage being located at a center of the arc welding cable,
    wherein a plurality of conductors are on a circumference around the passage with an opening between each adjacent conductor.

* * * * *